US010555250B2

(12) United States Patent
Wang et al.

(10) Patent No.: US 10,555,250 B2
(45) Date of Patent: *Feb. 4, 2020

(54) METHOD AND DEVICE FOR OBTAINING CONTENT OF SERVICE INFORMATION

(71) Applicant: ALIBABA GROUP HOLDING LIMITED, George Town, Grand Cayman (KY)

(72) Inventors: Lei Wang, Hangzhou (CN); Yin Wang, Hangzhou (CN); Yibin Xiong, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,030

(22) Filed: Jan. 8, 2019

(65) Prior Publication Data
US 2019/0150076 A1    May 16, 2019

Related U.S. Application Data

(63) Continuation of application No. 15/473,304, filed on Mar. 29, 2017, now Pat. No. 10,219,204, which is a (Continued)

(30) Foreign Application Priority Data

Sep. 17, 2014    (CN) .......................... 2014 1 0475307

(51) Int. Cl.
*H04W 48/00*        (2009.01)
*H04W 48/16*        (2009.01)
(Continued)

(52) U.S. Cl.
CPC ............ *H04W 48/16* (2013.01); *G06Q 30/02* (2013.01); *G06Q 30/0261* (2013.01);
(Continued)

(58) Field of Classification Search
CPC ....... H04W 48/16; H04W 48/10; H04W 4/80; H04W 4/60; G06Q 30/02; G06Q 30/0261; G06Q 30/0267; H04L 67/16
See application file for complete search history.

(56) References Cited

U.S. PATENT DOCUMENTS 7,103,313 B2    9/2006  Heinonen et al.
7,401,053 B2    7/2008  Kamimura et al.
(Continued)

FOREIGN PATENT DOCUMENTS

CN    103118327 A    5/2013
CN    103402177 A    11/2013
(Continued)

OTHER PUBLICATIONS

M.M. Lankhorst et al., "Enabling Technology for Personalizing Mobile Services," Proceedings of the 35' Hawaii International Conference on System Sciences, Jan. 2002 (8 pages).
(Continued)

*Primary Examiner* — Khai M Nguyen
(74) *Attorney, Agent, or Firm* — Finnegan, Henderson, Farabow, Garrett & Dunner, LLP

(57) ABSTRACT

A method for obtaining content of service information is provided. The method includes detecting service network information associated with a wireless network provided by a service information provider, obtaining an identifier included in the service network information, determining whether the identifier is stored in a database, and if it is determined that the identifier is stored in the database, obtaining the content of service information based on a corresponding relation between the identifier and the content of service information.

30 Claims, 7 Drawing Sheets

Related U.S. Application Data continuation of application No. 14/857,529, filed on Sep. 17, 2015, now Pat. No. 9,621,658.

(51) Int. Cl.

| | | |
|---|---|---|
| *H04L 29/08* | (2006.01) | |
| *H04W 4/06* | (2009.01) | |
| *H04W 4/80* | (2018.01) | |
| *G06Q 30/02* | (2012.01) | |
| *H04W 48/10* | (2009.01) | |

(52) U.S. Cl.
CPC ......... *G06Q 30/0267* (2013.01); *H04L 67/16* (2013.01); *H04W 4/06* (2013.01); *H04W 4/80* (2018.02); *H04W 48/10* (2013.01)

(56) References Cited

U.S. PATENT DOCUMENTS

| | | | |
|---|---|---|---|
| 7,672,280 B2* | 3/2010 | Shim | H04L 12/189 370/312 |
| 7,856,360 B2 | 12/2010 | Kramer et al. | |
| 8,456,671 B2 | 6/2013 | Kiyoshige | |
| 8,732,234 B2 | 5/2014 | Morse et al. | |
| 8,856,287 B2 | 10/2014 | Gregoire et al. | |
| 9,271,121 B1 | 2/2016 | McDonnell et al. | |
| 9,621,658 B2* | 4/2017 | Wang | H04L 67/16 |
| 2004/0238635 A1 | 12/2004 | Ozaki et al. | |
| 2007/0067227 A1 | 3/2007 | Ikeda | |
| 2007/0232221 A1 | 10/2007 | Miyata | |
| 2008/0004950 A1* | 1/2008 | Huang | G06Q 30/02 705/14.67 |
| 2009/0168707 A1 | 7/2009 | Nakae et al. | |
| 2009/0238193 A1 | 9/2009 | Nishida | |
| 2010/0250599 A1 | 9/2010 | Schmidt | |
| 2011/0022468 A1 | 1/2011 | Muster et al. | |
| 2011/0119351 A1 | 5/2011 | Tamura | |
| 2011/0197261 A1 | 8/2011 | Dong et al. | |
| 2012/0047256 A1* | 2/2012 | Hauser | G06F 21/36 709/224 |
| 2012/0106346 A1 | 5/2012 | Aguirre et al. | |
| 2012/0117210 A1 | 5/2012 | Naito et al. | |
| 2012/0239500 A1 | 9/2012 | Monahan | |
| 2012/0293465 A1 | 11/2012 | Nandu et al. | |
| 2013/0018714 A1 | 1/2013 | George | |
| 2013/0091246 A1 | 4/2013 | Urbanski | |
| 2013/0217332 A1 | 8/2013 | Altman et al. | |
| 2013/0311511 A1* | 11/2013 | Peng | G06F 16/9537 707/769 |
| 2014/0064260 A1* | 3/2014 | Mastenbrook | H04W 76/14 370/338 |
| 2014/0074636 A1 | 3/2014 | Ikumi et al. | |
| 2014/0220939 A1 | 8/2014 | Takae | |
| 2014/0250479 A1* | 9/2014 | Lee | H04N 7/08 725/110 |
| 2014/0295762 A1 | 10/2014 | Jung | |
| 2015/0150048 A1 | 5/2015 | Kim | |
| 2016/0029294 A1 | 1/2016 | Kim | |
| 2016/0080506 A1 | 3/2016 | Wang | |
| 2017/0208535 A1* | 7/2017 | Wang | H04L 67/16 |

FOREIGN PATENT DOCUMENTS

| | | |
|---|---|---|
| EP | 0716552 A2 | 6/1996 |
| EP | 2290967 A1 | 3/2011 |
| JP | 2005107897 A | 4/2005 |
| WO | WO 2004/004372 A1 | 1/2004 |
| WO | WO2007/069695 A1 | 5/2009 |
| WO | WO 2010/130117 A1 | 11/2010 |
| WO | WO 2014/074672 A2 | 5/2014 |

OTHER PUBLICATIONS

PCT International Search Report and Written Opinion dated Dec. 17, 2015, issued in corresponding International Application No. PCT/US2015/50792 (11 pages).

Extended European Search Report dated Jun. 3, 2019, European Application No. 19167898.6 (9 pgs).

Japanese Patent Office, Notice of Reasons for Refusal issued in corresponding Japanese Application No. 2017-514469, dated May 8, 2019, 6 pages.

SIPO First Search Report issued in corresponding Chinese Application No. 201410475307.7, dated Mar. 25, 2018, 1 page.

* cited by examiner

METHOD AND DEVICE FOR OBTAINING CONTENT OF SERVICE INFORMATION

CROSS-REFERENCE TO RELATED APPLICATION

This application is a continuation of U.S. application Ser. No. 15/473,304, filed Mar. 29, 2017, which is a continuation of U.S. application Ser. No. 14/857,529, filed Sep. 17, 2015, which is based upon and claims priority to Chinese Patent Application No. 201410475307.7, filed Sep. 17, 2014, all of which are incorporated herein by reference in their entireties.

TECHNICAL FIELD

The present application relates to the field of information technology and, more particularly, to a method and device for obtaining content of service information.

BACKGROUND

With rapid development of the information technology, a terminal device may receive broadcast information by businesses or governments such as commodity sales, promotion of merchants, offered services, and present the broadcast information to the user. After receiving the broadcast information, the user may then download or log onto a corresponding application on the terminal device to obtain the corresponding information or service.

Various types of information broadcast devices, such as WI-FI devices, Bluetooth devices, base stations, or information transmission apparatuses in dedicated frequency bands, may be used by merchants or individuals to provide the broadcast information. When entering into a service area, the user may turn on the corresponding information receiving device or application to search for the available service information in the surrounding area. After receiving broadcast information via the corresponding receiving device, typically the user needs to establish a communication connection with the information provider, identify content of service information, and then determine whether to obtain the service according to the content of the service information. If the user determines to obtain the service, the user may further start running the corresponding application in the terminal device or perform other actions. For example, merchants may offer a ten percent additional discount for users connecting to special promotion webpages for purchasing commodities via a wireless network S1 of shopping mall S. To take advantage of the offer, user A may use a terminal device to search for the wireless network S1 provided by shopping mall S via a WI-FI device, connect to the wireless network S1, and start running the shopping mall application pre-installed on the terminal device. In the meantime, user A may search for a wireless network M1 broadcast by restaurant M via WI-FI and receive electronic coupons for restaurant M by connecting to the wireless network M1.

After the user receives broadcast information of a merchant through the terminal device, it is generally required that the user further establish communication connections with the information transmission device of the merchant to learn the specific content of the service information or enjoy the corresponding service. When service information is available from various information providers, the user would be required to establish an active connection with each of the information providers, such as accessing the information provider's wireless network or logging onto applications related to the information provider. The process to obtain content of service information is relatively cumbersome, and as a result, the user may be unable to promptly select the desired service especially when a large number of information providers are available in the surrounding area.

SUMMARY

The present disclosure provides a method for obtaining content of service information. Consistent with some embodiments, the method includes detecting service network information associated with a wireless network provided by a service information provider, obtaining an identifier included in the service network information, determining whether the identifier is stored in a database, and if it is determined that the identifier is stored in the database, obtaining the content of service information based on a corresponding relation between the identifier and the content of service information.

Consistent with some embodiments, this disclosure provides another method for obtaining content of service information. The method includes detecting service network information associated with a wireless network provided by a service information provider, obtaining an identifier included in the service network information, identifying the service information provider based on a corresponding relation between the identifier and the service information provider, obtaining the content of service information based on the identified service information provider, and displaying the content of service information on a terminal device.

Consistent with some embodiments, this disclosure provides a device for obtaining content of service information. The device includes an information detecting module configured to detect service network information associated with a wireless network provided by a service information provider, an identifier obtaining module configured to obtain an identifier included in the service network information, and a determination module configured to determine whether the identifier is stored in a database. The device may further include a content obtaining module configured to obtain the content of service information based on a corresponding relation between the identifier and the content of service information, if the determination module determines that the identifier is stored in the database.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Consistent with some embodiments of this disclosure, a method for obtaining content of service information is provided. The method allows a terminal device to display content of the service information before a user establishes a communication connection with the corresponding information provider. Further, the method does not require the user to take into account the specific discovery modes associated with the specific information broadcast devices, and content of the service information may be presented to the user promptly for obtaining desired service.

A terminal device having wireless communication capabilities may be configured to detect service network information broadcast by various information providers in a surrounding area. For example, a terminal device may be configured to detect a Bluetooth network broadcast by a 2.4 GHz based low-power communication or a WI-FI network having a specified Service Set Identifier (SSID) and Medium Access Control (MAC) address broadcast by a WI-FI router based on the 802.11 protocol. The terminal device may use different information receiving devices to discover the service networks based on the type of information broadcast devices employed by the service providers. For example, the terminal device may detect the surrounding Bluetooth beacon information using the internal Bluetooth module so as to receive the broadcast Bluetooth network information. As another example, the terminal device may scan the surrounding SSIDs using the WI-FI module and connect to a Wireless Local Area Network (WLAN) to obtain corresponding services. In the present disclosure, a terminal device may include a laptop with wireless access apparatus (such as a wireless network card), a netbook, a cellphone, a Personal Digital Assistant (PDA), a Mobile Internet Device (MID), or the like.

Figure 1:
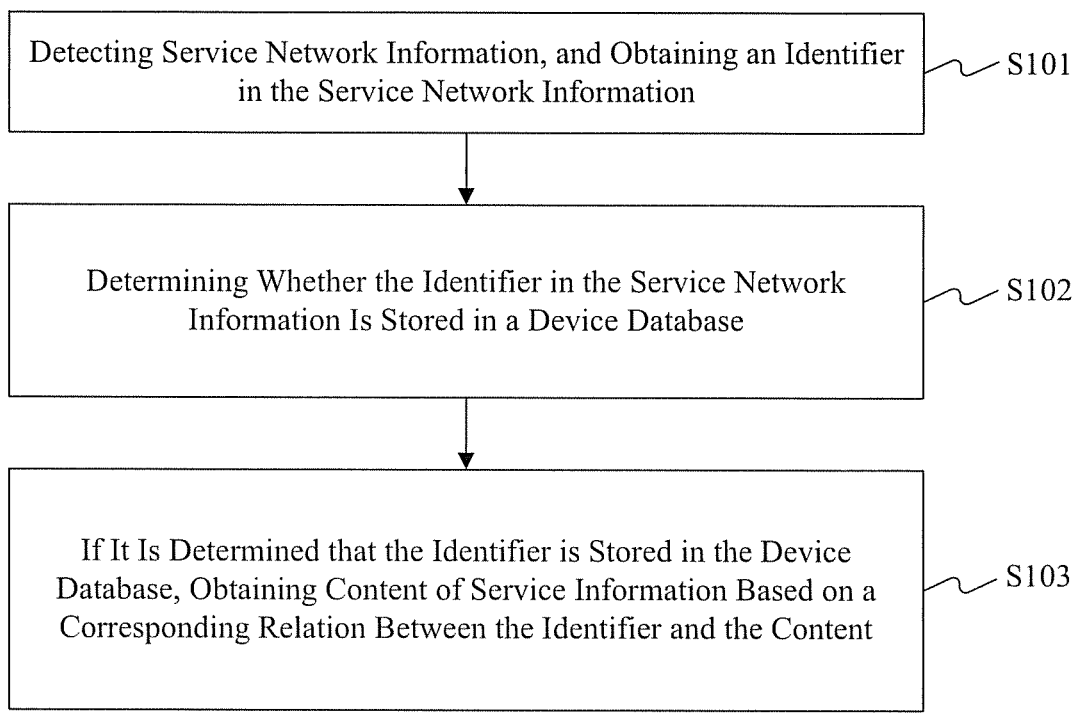
FIG. 1 is a flowchart of an exemplary method for obtaining content of service information, consistent with the present disclosure.

FIG. 1 is a flowchart of an exemplary method 100 for obtaining content of service information, consistent with the present disclosure. The exemplary method 100 may be performed by a terminal device. Referring to FIG. 1, the method 100 includes the following steps.

In step S101, the terminal device detects service network information and obtains an identifier in the detected service network information. The service network information may be provided by service information providers via Bluetooth, infrared, WLAN, cellular mobile communication, acoustic wave, or other wireless communication technologies. For example, a merchant B may set up a free WLAN service with an SSID of AlipayFree. The terminal device may detect service network information broadcast by the router of the AlipayFree wireless network. For example, the service network information may include the SSID of the AlipayFree wireless network and/or device identifiers of WI-FI devices providing the AlipayFree wireless network. The service network information may differ depending on the type of device providing the information. For example, when a Bluetooth device is adopted to broadcast the service network information, the terminal device may detect Bluetooth beacons that carry the service network information.

In some embodiments, the identifier identifying the service network may be predefined. For example, the identifier may be contained in specific fields in the service network information. As another example, the identifier may be the entire service network information or other identification information uniquely identified by the service network information. The identifier may be set according to particular devices or application scenarios. For example, the identifier may be the identification information of the wireless communication network, such as the SSID of the WLAN or Bluetooth beacon broadcast by Bluetooth devices. As another example, the identifier may be the identification information of a network device, such as the Serial Number or MAC address of the WI-FI device providing the service network, which may be obtained when the WLAN is discovered by the terminal device.

In step S102, the terminal device determines whether the identifier in the service network information is stored in a device database. For example, the terminal device may compare the identifier with a preset identifier pre-stored in the device database. In some implementations, the identifier may be compared with each of the preset identifiers in the device database, and if a preset identifier in the device database is identical with the identifier, the terminal device may determine that the service network information corresponding to the identifier is pre-registered or authorized for providing service information to the user. If no preset identifier in the device database is identical with the identifier, the terminal device may determine that the service network information corresponding to the identifier is unregistered or unauthorized and may process the information according to preset processing rules such as ignoring the service network information.

The preset identifier stored in the device database may include predefined identification information of various information provider devices, such as the Serial Number or MAC address of the WI-FI device broadcasting the service network information. The preset identifier may also include the identification information of the wireless network providing the service information such as a SSID of a WI-FI network, a Bluetooth beacon. For example, the device database may include the MAC address ADD_01 of a first WI-FI device of an electric appliance merchant B1 located at the mall entrance, the MAC address ADD_02 of a second WI-FI device arranged on the second floor of the mall by the electric appliance merchant B1, and the Bluetooth beacon broadcast by Bluetooth devices of a restaurant M beside the mall. In some embodiments, the preset identifier may also include region identification information of a cellular mobile network such as a cell identification code of a cellular mobile network.

In some implementations, the device database may be stored in an information data storage unit at the terminal device. The device database may also be stored in an information data storage unit located at a remote or dedicated server, and the terminal device may determine whether the identifier in the service network information is stored in the device database by exchanging information with the server. Furthermore, the device database may include other information of the broadcasting device associated with the service network information, such as the geographic location of the broadcasting device, status of the broadcasting device for providing information, the corresponding service information provider, etc.

In step S103, if it is determined that the identifier is stored in the device database, the terminal device obtains content of service information based on a corresponding relation between the identifier and the content. The content of service information may subsequently be output and displayed on the terminal device for users to browse and select.

In some embodiments, the content corresponding to the identifier may be preset, and may include one or more pieces of information. For example, the content of service information may include promotions, offers, information display, free internet access for specified applications, etc. Table 1 illustrates an example corresponding relation between the preset identifiers and the content.

TABLE 1

Corresponding relation between preset identifier and content of service information

| Preset identifiers | Content of service information |
| --- | --- |
| ADD_01 | Download application of B1 to watch a movie for 1 Yuan |
| ADD_02 | Purchase electric appliances on C1 to enjoy 15 percent discount |
| ADD_03 | Receive 50 percent off coupons of restaurant M on Street 1 |
| ADD_04 | Payment by Alipay and Tenpay is accepted in all merchant of mall B2 |
| ADD_B01 | Enjoy two hours of free parking by a purchase of 50 Yuan in mall B3 Mall B3 supports "Didi Taxi" |
| ADD_05 | Taobao shopping may be enjoyed in this area with free data traffic up to 200M |

Figure 2:
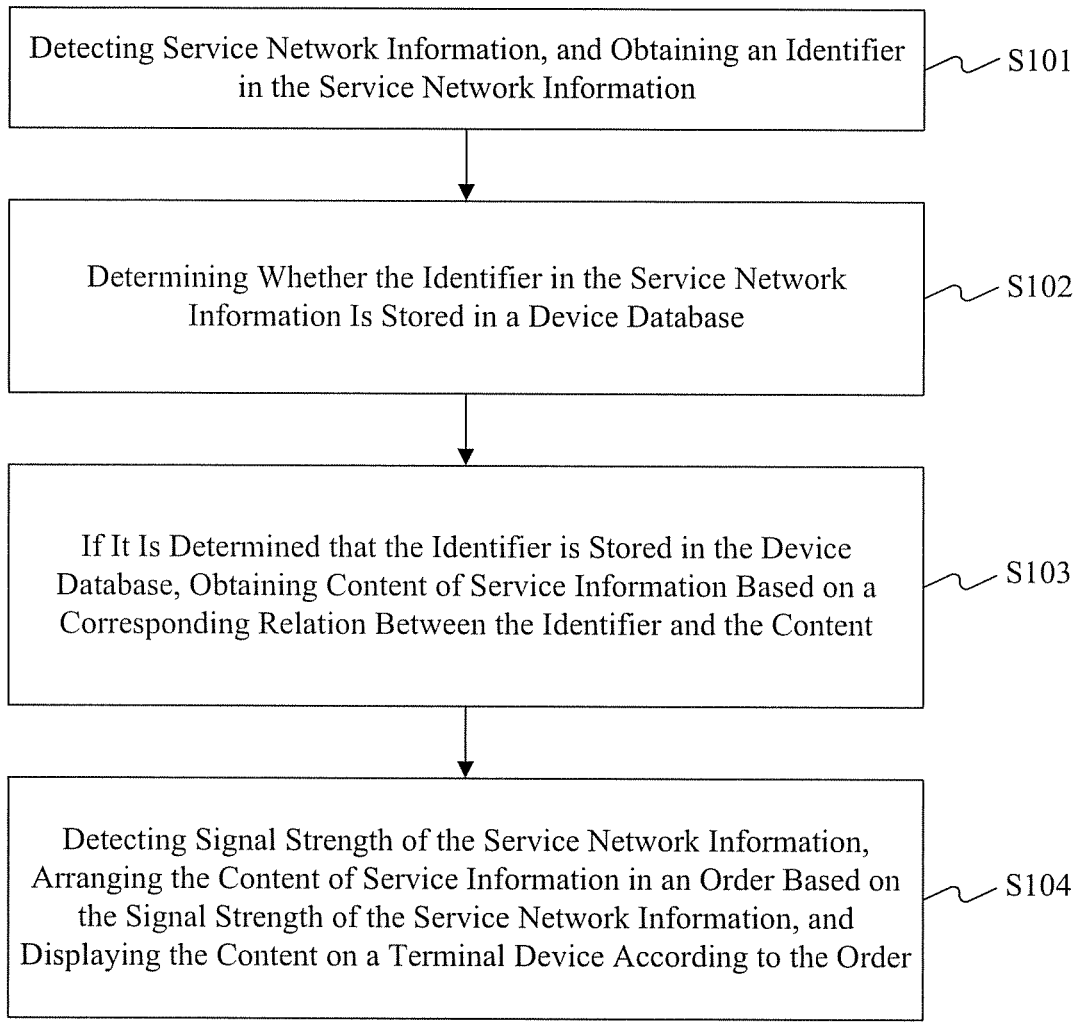
FIG. 2 is a flowchart of another exemplary method for obtaining content of service information, consistent with the present disclosure.

FIG. 2 is a flowchart of another exemplary method 200 for obtaining content of service information, consistent with the present disclosure. The exemplary method 200 may be performed by a terminal device. In the method 200, the service information may be output and displayed on the terminal device based on certain rules. Referring to FIG. 2, in addition to steps S101-S103 described above, the exemplary method 200 may further include step S104.

In step S104, the terminal device detects signal strength of the corresponding service network information, arranges content of the service information in an order based on the signal strength of the service network information, and displays the content according to the order. For example, the providers of the service network information may be located in a certain area, such as a large-scale shopping mall or underground pedestrian street. When the user enters an area covering various service network information providers, the terminal device may detect a plurality of pieces of service network information from a plurality of service network information providers and identify separate content of service information for each piece of the service network information. The terminal device may arrange the content of service information corresponding to a plurality of pieces of service network information based on the signal strength of the corresponding piece of service network information. In some implementations, the content corresponding to high signal strength of service network information may be placed on the top of the display, so that the user may select the content corresponding to higher signal strength of the service network information.

Figure 3:
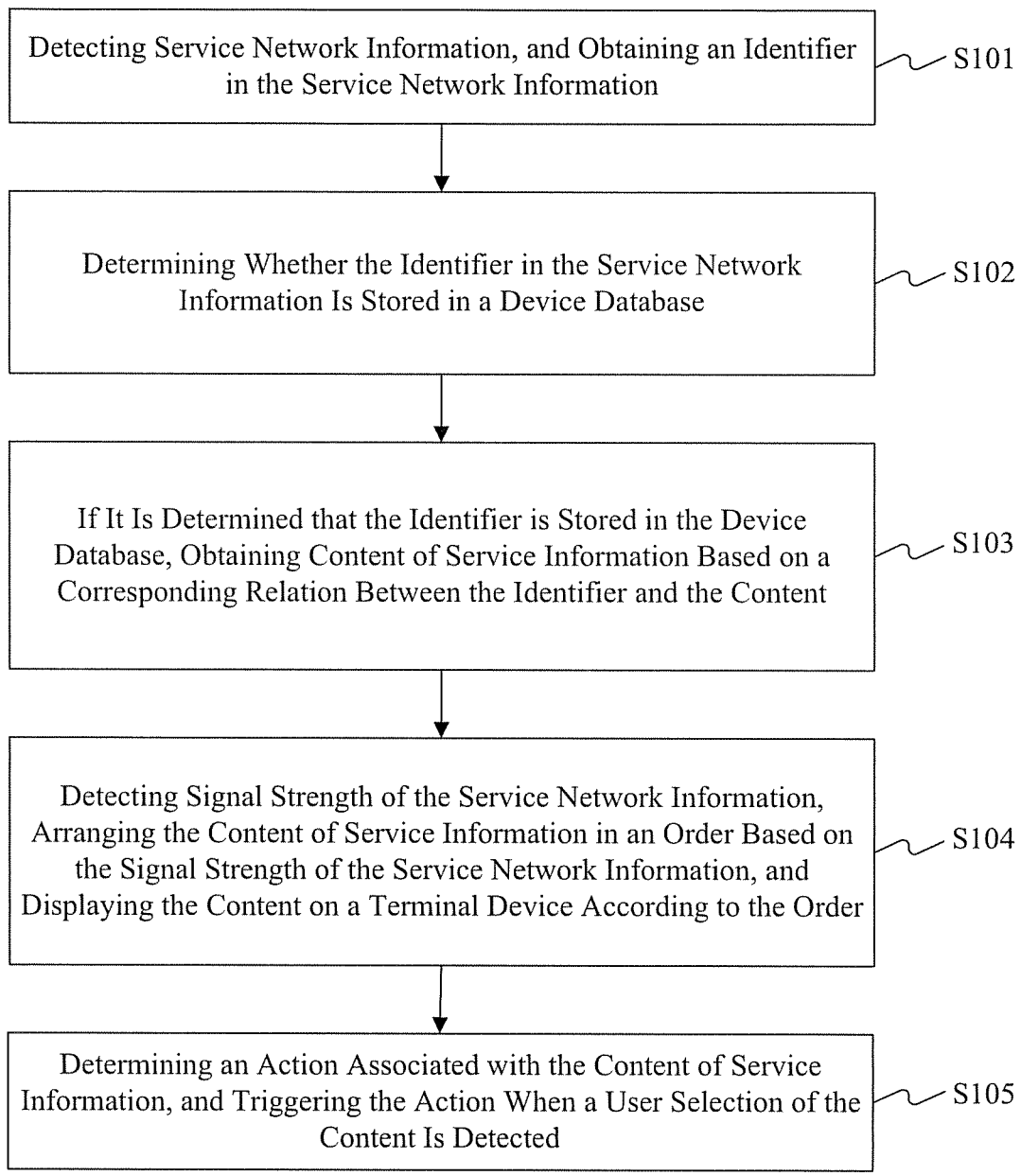
FIG. 3 is a flowchart of another exemplary method for obtaining content of service information, consistent with the present disclosure.

FIG. 3 is a flowchart of another exemplary method 300 for obtaining content of service information, consistent with the present disclosure. The method 300 may be performed by a terminal device. Referring to FIG. 3, in addition to steps S101-S104 described above, the exemplary method 300 may further include step S105.

In step S105, the terminal device determines an action associated with the content of service information and triggers the action when a user selection of the content is detected. The action associated with the content of service information may be preset and may include preset steps or actions executed at the time that the user selects the content. For example, the action associated with the content of service information may include starting a specified application on the terminal device, connecting to a specified webpage, receiving certain information, storing certain information, downloading a specified application, or the like. The action associated with the content of service information is not limited to the above actions, and may be set based on the particular service provider, service information, and so on.

In some embodiments, the terminal device may start a corresponding application in response to a user selection of the content, allowing the user to access the application corresponding to the content conveniently. For example, it may be preset that when the user selects the content "a free data traffic of 200M may be enjoyed when logging in Taobao in this area", a Taobao application on the terminal device is started. In other embodiments, the terminal device may receive and store certain information after a user selects the content. For example, it may be preset that when the user selects "receive 50 percent off coupons of restaurant M, Street 1", the electronic coupon is sent to the terminal device by the restaurant M via Bluetooth and stored in a predetermined folder of the terminal device.

In the above described methods, content of specific service information may be obtained through a predefined identifier received in the service network information. As a result, it is not necessary for users to be aware of the particular discovery mode of the broadcasting device used by the information provider (such as Bluetooth, WI-FI) for establishing a communication connection with the information provider or starting an application corresponding to the information provider. In doing so, users may be able to promptly access content of available service information and obtain the desired service.

Figure 4:
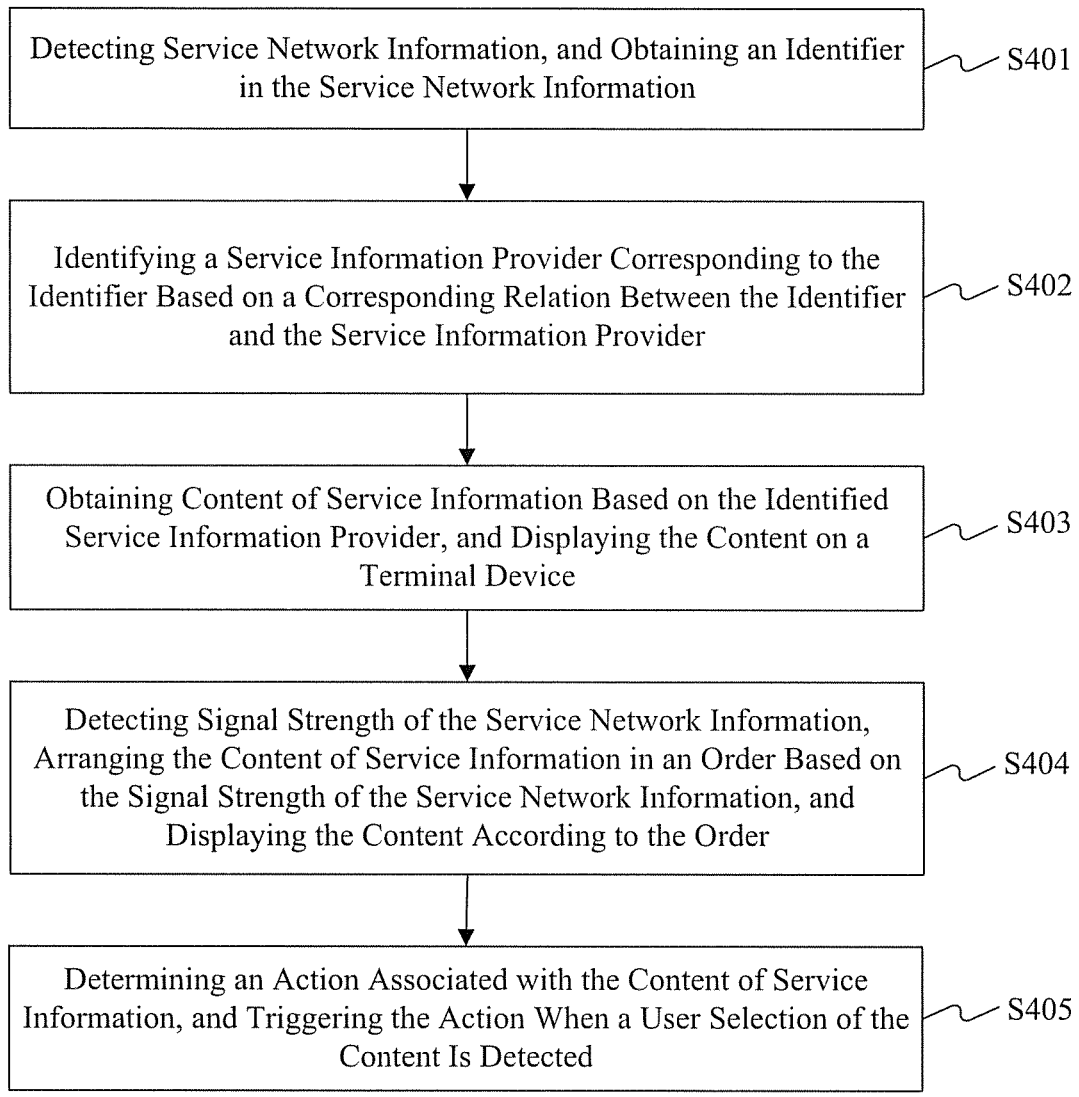
FIG. 4 is a flowchart of another exemplary method for obtaining content of service information, consistent with the present disclosure.

FIG. 4 is a flowchart of another exemplary method 400 for obtaining content of service information, consistent with the present disclosure. The method 400 may be performed by a terminal device. In the method 400, after an identifier in service network information is obtained, a service information provider corresponding to the identifier may be identified, and then content of service information provided by the service information provider is obtained and output on a terminal device for users to browse and select. Referring to FIG. 4, the method 400 includes the following steps.

In step S401, the terminal device detects service network information and obtains an identifier in the service network information. The identifier may include identification information of the device broadcasting the service network information, such as the Serial Number or MAC address of the broadcasting device. Step S401 may be implemented in a similar manner to that of step S101 described above in connection with FIG. 1.

In step S402, the terminal device identifies a service information provider corresponding to the identifier based on a corresponding relation between the identifier and the service information provider. For example, the service information provider using a network device to broadcast service network information may be identified based on the identification information of the network device.

In step S403, the terminal device obtains content of service information based on the identified service information provider, and displays the content on the terminal device. For example, the service available from the service information provider may be preset as content of service information, and when the service information provider is identified according to the identifier, the service available from the service information provider may be output and displayed on the terminal device for users to browse and select. The content of the service information are described above in connection with FIG. 1, and it is thus not repeated herein.

In step S404, the terminal device may detect signal strength of the corresponding service network information, arrange the content of service information in an order based on the signal strength of the service network information, and display the content according to the order. Step S404 may be implemented in a similar manner to that of step S104 described above in connection with FIG. 2.

In step S405, the terminal device may determine an action associated with the content of service information and trigger the action when a user selection of the content is detected. The action associated with the content may include starting a specified application on the client, connecting to a specified webpage, receiving certain information, storing certain information, downloading a specified application, or the like. Step S405 may be implemented in a similar manner to that of step S105 described above in connection with FIG. 3.

In some embodiments, the identifier may be the region identification information of a cellular mobile network provided by a mobile communication operator. For example, the cell identification code may be used as the identifier. In an example application scenario, customers of mobile communication operator T in a cell C may enjoy special service, such as logging onto certain application or accessing certain website free of data charge. In some implementations, the cell identification code may be obtained by the terminal device after it enters the specified cell C, and then the corresponding content of service information provided by the mobile operator T may be obtained according to the cell identification code. In some embodiments, the region identification information may also include the Location Area Code (LAC) for distinguishing different regions in the cellular mobile network.

The wireless communication network described above may employ short distance wireless communication technology, such as Bluetooth, IrDA, WI-FI or WLAN based on 802.11 series protocols, WI-FI Direct, Ultra Wide Band, Zigbee, Near Field Communication (NFC), WImax, etc. Other communication technologies may also be used to implement the above described embodiments without departing from the scope of the present disclosure.

Figure 5:
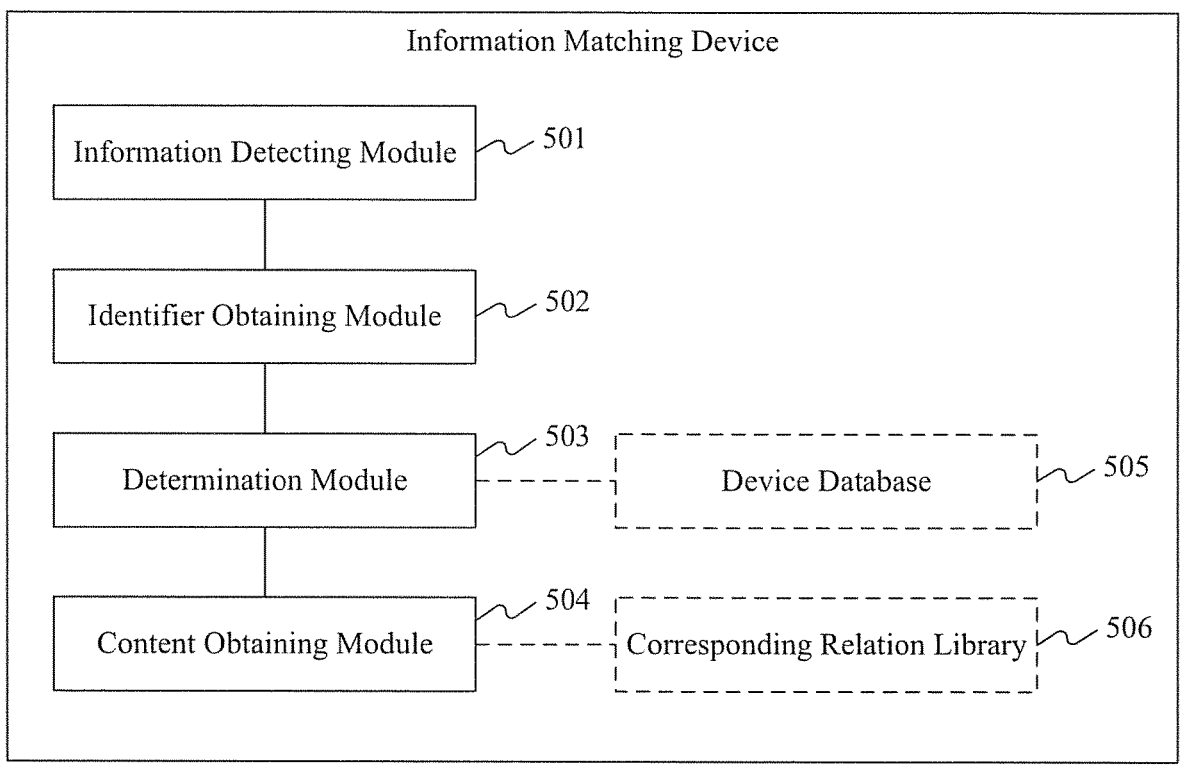
FIG. 5 is a block diagram of an exemplary device for obtaining content of service information, consistent with some embodiments of this disclosure.

FIG. 5 is a block diagram of an exemplary device 500 for obtaining content of service information, consistent with some embodiments of this disclosure. The device 500 may be implemented as a part or all of a terminal device. Referring to FIG. 5, the device 500 may include an information detecting module 501, an identifier obtaining module 502, a determination module 503, and a content obtaining module 504. In some embodiments, the device 500 may further include a device database 505 and a corresponding relation library 506.

The information detecting module 501 is configured to detect service network information. The identifier obtaining module 502 is configured to obtain an identifier from the detected service network information. The determination module 503 is configured to determine whether the obtained identifier in the service network information is stored in the device database 505. For example, the determination module 503 may be configured to compare the identifier in the service network information with the preset identifiers stored in the device database 505.

The content obtaining module 504 is configured to obtain content of service information based on the identifier and the corresponding relation stored in the corresponding relation library 506 if the determination module 504 determines that the obtained identifier is stored in the device database 505.

As shown in FIG. 5, the device database 505 and the corresponding relation library 506 may be stored locally in a terminal device or stored remotely in a server. When the device database 505 is stored in a remote server, the determination module 503 may be configured to perform information exchange with the server for determining whether the identifier is stored in the device database. Similarly, when the corresponding relation library 506 is stored in a remote server, the content obtaining module 504 may be configured to perform information exchange with the server for obtaining content of the service information.

Figure 6:
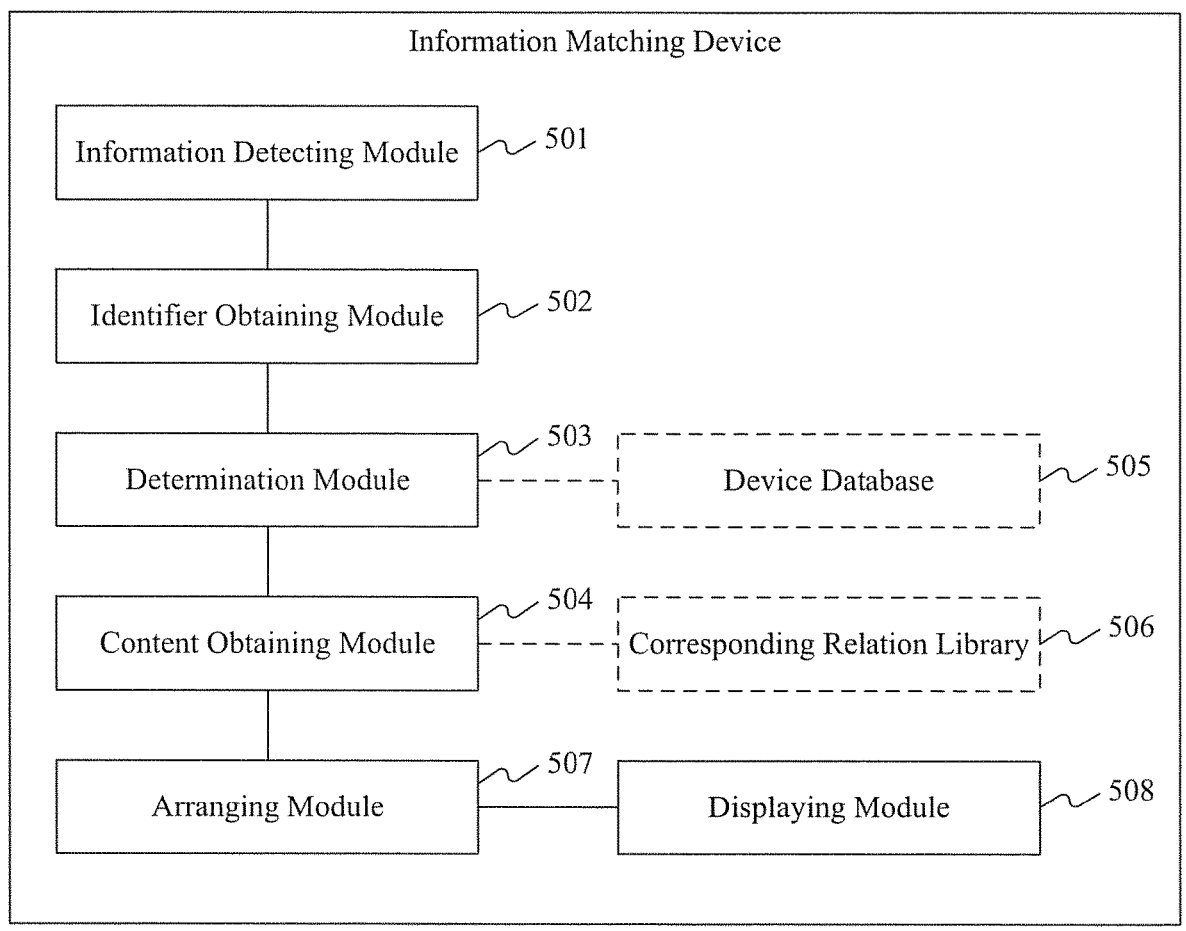
FIG. 6 is a block diagram of another exemplary device for obtaining content of service information, consistent with some embodiments of this disclosure.

FIG. 6 is a block diagram of another exemplary device 600 for obtaining content of service information, consistent with some embodiments of this disclosure. The device 600 may be implemented as a part or all of a terminal device. Referring to FIG. 6, the device 600 may further include an arranging module 507 and a displaying module 508, in addition to the information detecting module 501, identifier obtaining module 502, determination module 503, content obtaining module 504, device database 505, and corresponding relation library 506 described above.

The arranging module 507 is configured to detect signal strength of the service network information and arrange the content of service information in an order based on the signal strength. The displaying module 508 is configured to display the content according to the arranged order.

In this embodiment, by displaying the content of service information to the user according to the signal strength of the service network information, the user may conveniently select the content with high signal strength, thereby improving user experience of the service.

Figure 7:
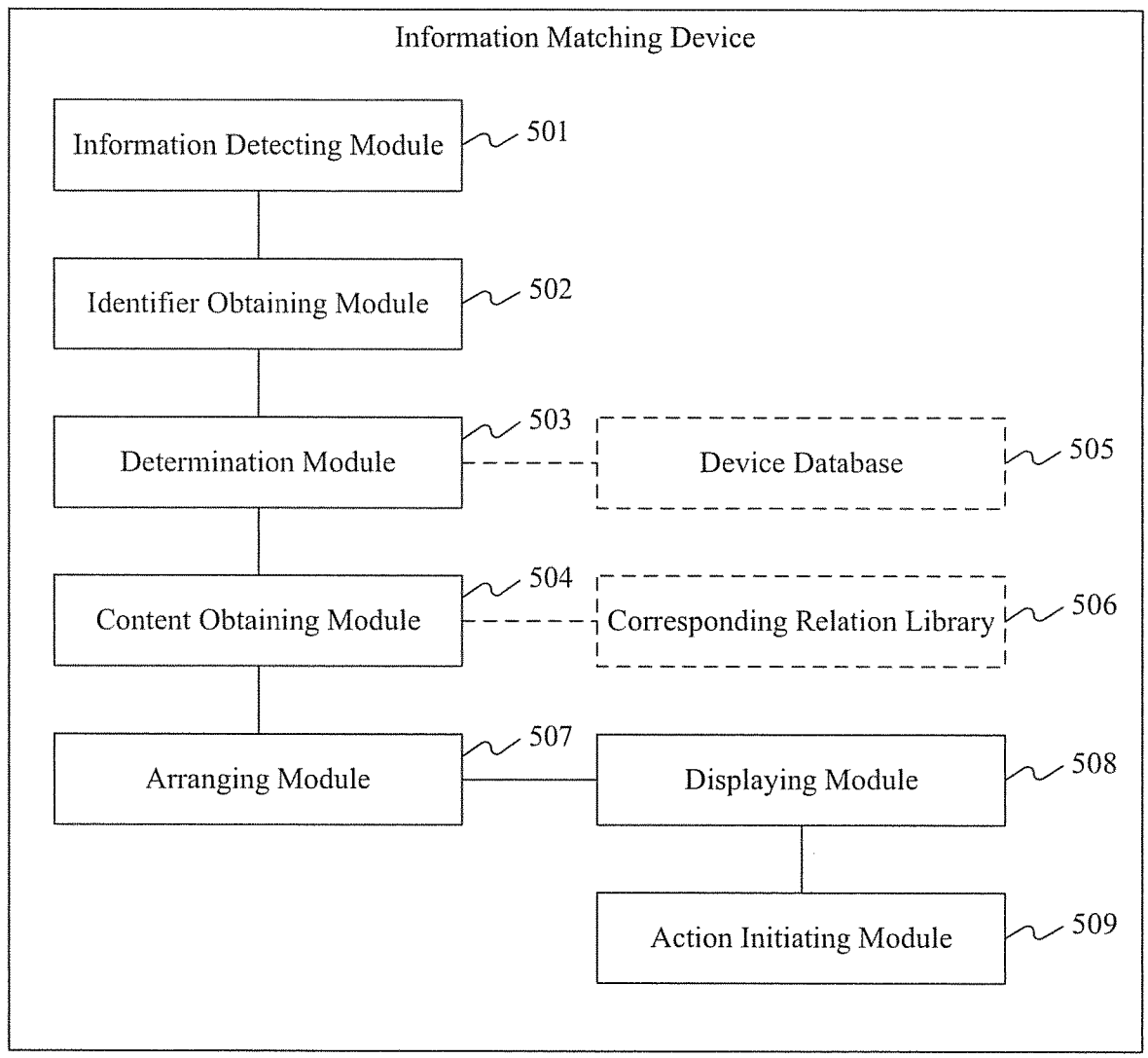
FIG. 7 is a block diagram of another exemplary device for obtaining content of service information, consistent with some embodiments of this disclosure.

FIG. 7 is a block diagram of another exemplary device 700 for obtaining content of service information, consistent with some embodiments of this disclosure. The device 700 may be implemented as a part or all of a terminal device. Referring to FIG. 7, the device 700 may further include an action initiating module 509 in addition to the information detecting module 501, identifier obtaining module 502, determination module 503, content obtaining module 504, device database 505, corresponding relation library 506, arranging module 507, and displaying module 508 described above.

The action initiating module 509 is configured to determine the action associated with the content of service information and trigger the action when a user selection the content is detected. In some embodiments, the action associated with the content of service information may include starting a specified application on the terminal device, connecting to a specified webpage, receiving certain information, storing certain information, downloading a specified application, or the like.

In some embodiments, various types of service network information provided by different network devices may be represented by information data models, and the service network information may be obtained and processed by a predetermined information processing method to take into account the differences among the different types of service information discovery modes such as Bluetooth and WI-FI. In doing so, the user may conveniently obtain the content of the service information or access a corresponding service application, thereby improving user experience of the service.

Although embodiments are described with reference to communication protocols such as WI-FI, cellular mobile communication, and Bluetooth, the present disclosure is not limited to applications with standard communication protocols such as WI-FI, cellular mobile communication, and Bluetooth, etc. The described embodiments may also be implemented by proprietary protocols or transmission mechanisms modified from standard communication protocols.

In exemplary embodiments, a non-transitory computer-readable storage medium including instructions is also provided, and the instructions may be executed by a device (such as a terminal device, a server, a personal computer, or the like), for performing the above-described methods. The device may include one or more processors (CPUs), an input/output interface, a network interface, and/or a memory. For example, the non-transitory computer-readable storage medium may be read-only memory (ROM), random access memory (RAM), Compact Disc Read-Only Memory (CD-ROM), magnetic tape, floppy disk, and optical data storage device, etc.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

One of ordinary skill in the art will understand that the above described embodiments may be implemented by hardware, or software (program codes), or a combination of hardware and software. If implemented by software, it may be stored in the above-described computer-readable media. The software, when executed by the processor may perform the disclosed methods. The computing units and the other functional units described in this disclosure may be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A method for obtaining content of service information, comprising:

detecting, by a terminal device, service network information broadcasted via a wireless network, the wireless network associated with a service information provider;

obtaining, by the terminal device, an identifier included in the service network information, the identifier including identification information of the wireless network;

determining whether the identifier is stored in a database of the terminal device; and in response to determining that the identifier is stored in the database, obtaining, from a library stored locally in the terminal device, the content of service information based on a corresponding relation between the identifier and the content of service information and displaying the content of service information on the terminal device.

2. The method according to claim 1, further comprising:

detecting signal strength of the service network information;

arranging the content of service information in an order based on the signal strength of the service network information; and displaying the content of service information on the terminal device according to the order.

3. The method according to claim 1, further comprising:

determining an action associated with the content of service information; and triggering the action when a user selection of the content of service information is detected.

4. The method according to claim 3, wherein the action associated with the content of service information comprises at least one of: starting an application on a terminal device, connecting to a webpage, receiving information, storing information, or downloading an application.

5. The method according to claim 1, wherein the identifier further comprises at least one of: identification information of a device broadcasting the service network information, or region identification information of a cellular mobile network.

6. The method according to claim 1, wherein the database includes a plurality of preset identifiers and content of corresponding service information for each of the preset identifiers.

7. A method for obtaining content of service information, comprising:

detecting, by a terminal device, service network information broadcasted via a wireless network, the wireless network associated with a service information provider;

obtaining, by the terminal device, an identifier included in the service network information, the identifier including identification information of the wireless network;

identifying the service information provider based on a corresponding relation between the identifier and the service information provider;

obtaining, from a library stored locally in the terminal device, the content of service information based on the identified service information provider; and displaying the content of service information on the terminal device.

8. The method according to claim 7, further comprising:
detecting signal strength of the service network information;
arranging the content of service information in an order based on the signal strength of the service network information; and
displaying the content of service information on the terminal device according to the order.

9. The method according to claim 7, further comprising:
determining an action associated with the content of service information; and
triggering the action when a user selection of the content of service information is detected.

10. The method according to claim 9, wherein the action associated with the content of service information comprises at least one of: starting an application on a terminal device, connecting to a webpage, receiving information, storing information, or downloading an application.

11. The method according to claim 7, wherein the identifier further comprises at least one of: identification information of a device broadcasting the service network information, or region identification information of a cellular mobile network.

12. The method according to claim 7, wherein the service network information is broadcast by a network device using a WI-FI or Bluetooth communication protocol.

13. A device for obtaining content of service information, comprising:
a memory storing a set of instructions; and
a processor configured to execute the set of instructions to cause the device to perform:
detecting service network information broadcasted via a wireless network, the wireless network associated with a service information provider;
obtaining an identifier included in the service network information, the identifier including identification information of the wireless network;
determining whether the identifier is stored in a database in the device; and
obtaining, from a library stored locally in the device, the content of service information based on a corresponding relation between the identifier and the content of service information, in response to the determination that the identifier is stored in the database.

14. The device according to claim 13, wherein the processor is further configured to execute the set of instructions to cause the device to perform:
detecting signal strength of the service network information, and arrange the content of service information in an order based on the signal strength of the service network information; and
displaying the content of service information on a terminal device according to the order.

15. The device according to claim 13, wherein the processor is further configured to execute the set of instructions to cause the device to perform:
determining an action associated with the content of service information, and
triggering the action when a user selection of the content of service information is detected.

16. The device according to claim 15, wherein the action associated with the content of service information comprises at least one of: a starting of an application on a terminal device, a connection to a webpage, a receiving of information, a storing of information, or a downloading of an application.

17. The device according to claim 13, wherein the identifier further comprises at least one of: identification information of a device broadcasting the service network information, or region identification information of a cellular mobile network.

18. The device according to claim 14, wherein the database includes a plurality of preset identifiers and content of corresponding service information for each of the preset identifiers.

19. A non-transitory computer readable medium that stores a set of instructions that is executable by at least one processor of a terminal device to cause the terminal device to perform a method for obtaining content of service information, the method comprising:
detecting service network information broadcasted via a wireless network, the wireless network associated with a service information provider;
obtaining an identifier included in the service network information, the identifier including identification information of the wireless network;
determining whether the identifier is stored in a database of the terminal device; and
in response to determining that the identifier is stored in the database, obtaining, from a library stored locally in the terminal device, the content of service information based on a corresponding relation between the identifier and the content of service information and displaying the content of service information on the terminal device.

20. The non-transitory computer readable medium of claim 19, wherein the set of instructions that is executable by the at least one processor of the terminal device to cause the terminal device to further perform:
detecting signal strength of the service network information;
arranging the content of service information in an order based on the signal strength of the service network information; and
displaying the content of service information on the terminal device according to the order.

21. The non-transitory computer readable medium of claim 19, wherein the set of instructions that is executable by the at least one processor of the terminal device to cause the terminal device to further perform:
determining an action associated with the content of service information; and
triggering the action when a user selection of the content of service information is detected.

22. The non-transitory computer readable medium of claim 19, wherein the action associated with the content of service information comprises at least one of: starting an application on a terminal device, connecting to a webpage, receiving information, storing information, or downloading an application.

23. The non-transitory computer readable medium of claim 19, wherein the identifier further comprises at least one of: identification information of a device broadcasting the service network information, or region identification information of a cellular mobile network.

24. The non-transitory computer readable medium of claim 19, wherein the database includes a plurality of preset identifiers and content of corresponding service information for each of the preset identifiers.

25. A non-transitory computer readable medium that stores a set of instructions that is executable by at least one processor of a terminal device to cause the terminal device to perform a method for obtaining content of service information, the method comprising:
   detecting service network information broadcasted via a wireless network, the wireless network associated with a service information provider;
   obtaining an identifier included in the service network information, the identifier including identification information of the wireless network;
   identifying the service information provider based on a corresponding relation between the identifier and the service information provider;
   obtaining, from a library stored locally in the terminal device, the content of service information based on the identified service information provider; and
   displaying the content of service information on the terminal device.

26. The non-transitory computer readable medium of claim 25, wherein the set of instructions that is executable by the at least one processor of the terminal device to cause the terminal device to further perform:
   detecting signal strength of the service network information;
   arranging the content of service information in an order based on the signal strength of the service network information; and
   displaying the content of service information on the terminal device according to the order.

27. The non-transitory computer readable medium of claim 25, wherein the set of instructions that is executable by the at least one processor of the terminal device to cause the terminal device to further perform:
   determining an action associated with the content of service information; and
   triggering the action when a user selection of the content of service information is detected.

28. The non-transitory computer readable medium of claim 26, wherein the action associated with the content of service information comprises at least one of: starting an application on a terminal device, connecting to a webpage, receiving information, storing information, or downloading an application.

29. The non-transitory computer readable medium of claim 25, wherein the identifier further comprises at least one of: identification information of a device broadcasting the service network information, or region identification information of a cellular mobile network.

30. The non-transitory computer readable medium of claim 25, wherein the service network information is broadcast by a network device using a WI-FI or Bluetooth communication protocol.

* * * * *

UNITED STATES PATENT AND TRADEMARK OFFICE
CERTIFICATE OF CORRECTION

| | | |
|---|---|---|
| PATENT NO. | : 10,555,250 B2 | |
| APPLICATION NO. | : 16/243030 | |
| DATED | : February 4, 2020 | |
| INVENTOR(S) | : Lei Wang et al. | |

It is certified that error appears in the above-identified patent and that said Letters Patent is hereby corrected as shown below:

On the Title Page

Item (30), in the Foreign Application Priority Data, "2014 1 0475307" should read --201410475307.7--.

Signed and Sealed this
Thirty-first Day of October, 2023

Katherine Kelly Vidal
*Director of the United States Patent and Trademark Office*